(12) United States Patent
Schuler et al.

(10) Patent No.: US 8,313,129 B2
(45) Date of Patent: Nov. 20, 2012

(54) ENERGY ABSORBER

(75) Inventors: Marco Schuler, Freiburg (DE); Florian Danzeisen, Eichstetten (DE); Norbert Tschiggfrei, Eichstetten (DE); Robert Basile, Boetzingen (DE)

(73) Assignee: Peguform GmbH, Bötzingen (DE)

( * ) Notice: Subject to any disclaimer, the term of this patent is extended or adjusted under 35 U.S.C. 154(b) by 0 days.

(21) Appl. No.: 12/964,520

(22) Filed: Dec. 9, 2010

(65) Prior Publication Data
US 2011/0309653 A1    Dec. 22, 2011

(30) Foreign Application Priority Data
Dec. 11, 2009 (DE) .................. 20 2009 016 759 U

(51) Int. Cl.
*B60R 19/18* (2006.01)

(52) U.S. Cl. ................. 293/120; 296/187.03; 280/751; 293/132

(58) Field of Classification Search ......... 293/120–122, 293/187.04, 187.05, 131–133; 280/748, 280/751; 296/187.03–187.13
See application file for complete search history.

(56) References Cited

U.S. PATENT DOCUMENTS

| 3,933,387 A * | 1/1976 | Salloum et al. ............... 293/120 |
| 6,145,921 A * | 11/2000 | Cho ......................... 296/187.05 |
| 6,682,128 B2 * | 1/2004 | Carroll et al. ............ 296/187.03 |

FOREIGN PATENT DOCUMENTS

| DE | 198 61 026 | 6/2000 |
| DE | 100 42 560 | 3/2002 |
| DE | 100 48 902 | 4/2002 |
| DE | 102 53 270 | 6/2004 |
| DE | 103 52 629 | 6/2004 |
| DE | 102 60 387 | 7/2004 |
| DE | 10 2004 008 740 | 6/2005 |
| DE | 10 2004 048 504 | 4/2006 |
| DE | 102004048504 | * 4/2006 |
| DE | 10 2005 37 152 | 2/2007 |
| DE | 10 2005 039 469 | 2/2007 |
| DE | 10 2006 000 502 | 4/2008 |
| EP | 1 577 168 | 9/2005 |
| JP | 2008 013 124 | 1/2008 |

* cited by examiner

*Primary Examiner* — Dennis Pedder
(74) *Attorney, Agent, or Firm* — Ursula B. Day

(57) ABSTRACT

An energy absorber for damping the impact upon the body of a motor vehicle includes energy absorbing bodies that include successively arranged support walls with a number of energy absorbing structural elements that are each separately arranged at the support wall and are firmly connected to the support wall. Upon impact, each of the structural elements absorb energy by moving towards an opposite support wall while adjoining neighboring structural element until the structural elements are compacting.

21 Claims, 3 Drawing Sheets

ENERGY ABSORBER

CROSS-REFERENCES TO RELATED APPLICATIONS

This application claims the priority of German Patent Application Serial No. 20 2009 016 759.3, filed Dec. 11, 2009 pursuant to 35 U.S.C. 119(a)-(d), the subject matter of which is incorporated herein by reference.

BACKGROUND OF THE INVENTION

The present invention relates to an energy absorber for damping an impact on an element of the body of a motor vehicle, said energy absorber including essentially two support walls successively disposed with a number of single energy absorbing structural elements disposed in between.

Energy absorbing structures are provided in many areas in a motor vehicle body, to protect both, structures that are arranged spatially behind the energy absorbers, as well as protecting the passengers in case of a collision. Such energy absorbing structures or bodies are typically in the area of the bumper systems where, for example, energy absorbing elements or structures are integrated into the space between the mostly bowl shaped bumper and the bumper cross beam. These absorber areas are designed to absorb the energy of a collision, where the main emphasis, in case of a collision with a person, is to protect the person, while in a collision with another object, mostly the motor vehicle itself, or the structures that are being impacted upon are to be protected and to thus minimize the damage to the motor vehicle as much as possible.

To date, it has not been possible to optimally combine both afore-stated goals. Normally even today, the EPP-foam is still used as absorber material in order to comply with the legal regulation for the protection of pedestrians, for which this foam is well suited, although the foam has the disadvantage that it is too soft such that collisions at low speed with other motor vehicles, the foam does not absorb enough energy and as a result, damage occurs to the motor vehicle.

DE 100 42 560 B4 describes a support structure of a motor vehicle with a front end which is configured dual bowl shaped with an outer front end bowl shaped part which is a front end bumper, and an inner relatively rigid front end bowl shaped part which is the bumper cross beam and a deformation element which is disposed between the bumper and the bumper cross beam and has a foam structure.

In EP 1 577 168 A1 bumpers are described as energy absorbing component parts that are configured as blow molded hollow bodies that surround a foam filling on both sides.

The use of foam as an energy absorbing agent has the advantage that the foam is light and inexpensive. However, foam requires relatively much room with the additional disadvantage that the material, in case of an impact, does not revert 100% to its additional shape, which means that the energy absorbing material remains less effective as an energy absorber after each collision.

DE 102 387 A1 describes a bumper arrangement for a motor vehicle which is compact in structure and provides good pedestrian protection. An insert which is disposed between the bumper and the bumper cross beam has a plurality of nub-type deformation cups which when the insert is mounted are coordinated in such manner that upon impact, in case of a collision, while absorbing energy, the insert is plastic deformable through deformation of the deformation cups at the bumper cross beam with short block length. A drawback of this system is that the insert has to be configured specifically for the corresponding component assembly in the front end area, and is thus relatively complex in its construction. In addition, while the danger of injury for a pedestrian is reduced, the deformation cups, in case of a collision, react still relatively hard, whereby the motor vehicle is pretty well protected, however does not provide ideal pedestrian protection.

DE 10 2004 048 504 A1 describes an absorber body for a motor vehicle body element which consists of a plurality of side by side predetermined bending elements arranged under the outer skin of the body element. These predetermined bending elements are arranged set off in successive order between at least two support walls of the absorber body under the outer skin and are pre-formed such that in case of an impact, as a result, they follow a defined bending action. A body element of this type does not immediately give after subjected to static stress and at the same time when subjected to dynamic stress provides an effective protection against impact, e.g. when hitting a pedestrian. The energy absorbing effect can be controlled and adjusted by the bending angle, whereby for certain stresses substantially ideal absorption effects can be determined. However, this absorption body also has the drawback that a compromise must be sought between pedestrian protection and protection of the motor vehicle, which results in the fact that both goals cannot be optimally realized.

Thus, the problem persists to obtain an absorption body which fulfills both of these goals and which does not include the drawbacks of the prior art. It would therefore be desirable and advantageous to provide an improved absorption body to obviate prior art shortcomings and to provide protection both to the pedestrian and the motor vehicle.

SUMMARY OF THE INVENTION

According to one aspect of the present invention, an energy absorber for absorbing an impact on a body element of a motor vehicle consists essentially of two successively arranged support walls that have arranged between them a plurality of single energy absorbing structural elements which are each separate from each other and are firmly connected at the two support walls.

The present invention resolves prior art problems by providing the absorber body with energy absorbing elements and is configured as an "adaptable absorber", which not only fulfills the legal requirements for pedestrian protection but also fulfills the toughness requirements necessary to avoid small impact damage resulting from a collision with another vehicle at low speeds.

In another aspect of the present invention, the energy absorber has a special configuration allowing for local sliding and a soft course at a limited local stress impact, such as for example, when impacting the leg of a pedestrian. The same configuration can be applied when there is a need for stress impact absorption involving large areas, such as for example, at a pendulum impact during a collision with the bumper system of another motor vehicle, which behaves relatively rigid and provides resistance against the impact up to a certain point and upon exceeding that can provide a controlled deformation- or folding pattern, whereby much energy is absorbed such as required for crashes that are beyond those for pedestrian protection.

The energy absorber according of the present invention for damping an impact onto a body element of a motor vehicle includes an energy absorbing body, which essentially consists of two successively disposed support walls. Between the support walls, a plurality of single energy absorbing structural elements are arranged, disposed separately and connected firmly to the support walls.

These energy absorbing structural elements are configured as U-shaped, and tunnel-like polyeders that are attached to the support wall by the foot of a web forming at least one tunnel wall of each polyeder. Thereby, the structural elements that are configured as tunnel shaped polyeders extend throughout the energy absorbing body perpendicular to the direction of a potential impact.

These energy absorbing structural elements each are arranged set off relative to one another and at opposite support walls in such a manner that each structural element engages with the other in zipper-like fashion. The energy absorbing structural elements at the support walls are uniformly sized at defined distances relative to each other to match the configuration of the structural elements positioned set off at the opposite support wall. The distance is measured so that the set off energy absorbing opposite structural elements, during a crash, are able to slide into each other, such that the distance between two structural elements disposed at the support wall provides the necessary space needed so that each of the structural elements can slide against the support wall. In order to additionally facilitate this gliding or sliding motion, the configuration of the structural elements at one support wall includes gliding surfaces for each of the structural elements that are disposed at the other support wall in set off fashion.

In a preferred embodiment of the present invention, a surface forming the tunnel ceiling, which is configured of two oppositely located energy absorbing structural elements that are shaped as polyeders and oriented offset from each other, is configured as a gliding surface at an oblique angle relative to a direction of the potential impact where each of the two structural elements are adjoining the other. The angle between the impact direction and the gliding surface is in the range from 90° to 180°, preferably from 120° to 150°, especially preferred about 135°.

In addition, the surface that is forming the tunnel wall of two oppositely located and energy absorbing structural elements shaped as polyeders, oriented set off from each other and at an oblique angle relative to a direction of the potential impact, is configured essentially as an additional gliding surface where the two structural elements are also partially adjoining each other.

When a person's leg, acting as an impacting object, hits the absorber, then the resulting force is transferred from one energy absorbing structural element via the oblique gliding surface onto the oppositely located energy absorbing structural element. In addition, the resulting gliding off motion determines the deformation direction. This gliding off motion or the deformation is facilitated when the energy absorbing structural element that is configured as a U-shaped tunnel-like polyeder is connected to the respective support wall only by the foot of a web which forms the tunnel wall, while the other web, or the other surface of the polyeder, not attached at the support wall can thus yield to the deformation direction, whereby a deflection in the direction of the deformation of the respective energy absorbing structural elements under avoidance of blocking is realized.

When the surface of the absorber is put under stress, such as for example, when incurring a pendulum impact, the absorber exhibits a stiff deformation behavior. In that case, all energy absorbing structural elements move simultaneously toward each other, so that due to the special configuration of the oblique plane, lateral forces are released that counteract a gliding motion up to a limit. The energy absorbing structural elements thus obstruct each other and only when passing a certain energy level, a controlled deformation and folding process begins by which the amount of high energy will be absorbed and to thereby satisfy the crash safety requirements for pedestrians.

In a further advantageous embodiment of the present invention, the configuration of the energy absorbing structural elements is slightly modified, whereby the distance between each of the U-shaped, tunnel-like polyeders disposed at the support wall is chosen in such a way that the polyeder opposite the gap and disposed at the second support wall, in the case of a crash, is completely taken up by the gap located directly opposite up to a certain degree of compression of the energy absorber without resistance to the compression. This way, energy absorbing structural elements are moved up to each opposite support wall and from that moment on absorb energy when their tips hit the support wall, so hat simultaneously, the gliding surfaces formed as tunnel walls come to adjoin each other.

The stability of the energy absorbing structural elements is chosen in such a way that in case of a local impact, generated for example by a collision with a pedestrian, the structural elements will easily yield and are then completely compressed at the location of the collision. Similar to the afore-described embodiment, the energy absorber exhibits an increased firmness only when all or at least a majority of the energy absorbing structural elements are impacted by the collision, and are thereby moved into each other, whereby then the elements laterally support each other and thus confer an increased rigidity to the energy absorber, to thereby realize, in case of a collision, the desired protection for both, the pedestrian and the motor vehicle. In this case also, the energy absorbing structural elements obstruct each other, and only when a certain energy level has been passed, a controlled deformation and folding process is initiated in order to absorb larger amounts of energy.

While the preferred embodiment of the present invention is explained in connection with a motor vehicle body element that is a bumper, where the rearmost of the successively disposed support walls is configured as part of the bumper cross beam, and the frontal of the two support walls forms the outer skin of the bumper, the energy absorber is not limited for use in bumper systems, but can be applied to any part of the motor vehicle body that is prone to be impacted. Typically, the energy absorber is made from plastic and can be applied as a separate energy absorbing body or can be integrated directly into the motor vehicle body element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
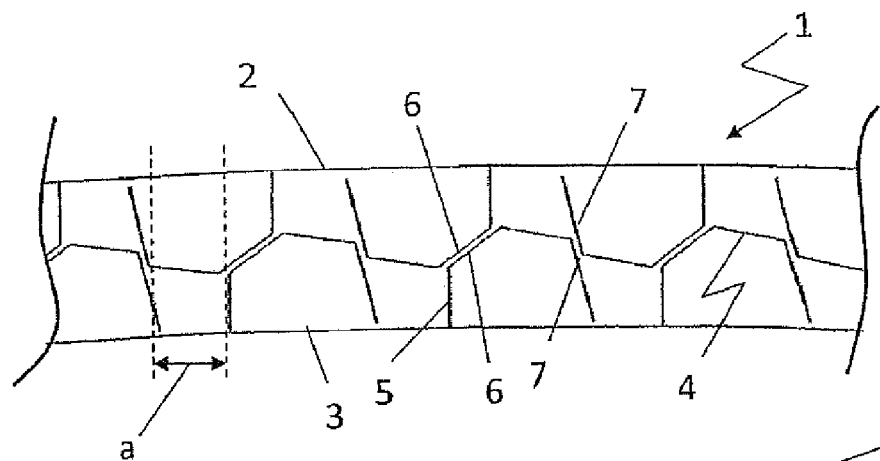
FIGS. 1 and 2 each show a detail of a top view of a cross section of an energy absorber according to the present invention.

Throughout all the Figures, same or corresponding elements are generally indicated by same reference numerals.

Turning now to the drawing, and in particular to FIG. 1, there is shown a top view of the cross section of a detail of an energy absorber, representing the principle of the assembly of the energy absorber. The energy absorbing body consists essentially of two successively arranged support walls 2, 3 and a plurality of single uniformly constructed energy absorbing structural elements 4 arranged between them. The energy absorbing structural elements 4 are constructed as U-shaped, tunnel-like polyeders that are each connected by means of the foot of a web 5 with the support wall 2, 3, such that the energy absorbing structural elements 4 that are arranged uniformly set off relative to each other at the opposite support walls 2, 3 engage with each other in zipper-like manner.

Between each of the energy absorbing structural elements 4, a uniform defined average distance is provided which is adjusted to the configuration of each of the energy absorbing structural elements 4 arranged set off at opposite support walls 2, 3. This distance is chosen so that the structural element 4 opposite the gap has sufficient space to be moved in the direction of each opposite support wall 2, 3. The movement of the structural element 4 follows along the gliding surfaces 6, 7 into the gap between the two opposite structural elements 4. The configuration of the energy absorber or the energy absorbing structural elements is selected so that the gliding surfaces 6, 7 are adjoining each other in the starting position.

The gliding surface 6 is formed by a surface forming the tunnel ceiling of the polyeder and arranged at an oblique angle to the direction of the impact R, such that the gliding surface 6 of the structural element 4 is bearing against another gliding surface 6 of the opposite set off structural element. An angle α between the expected impact direction and the gliding surface 6 is in the range from 90° to 180°. In a preferred embodiment, the range is from 120° to 150°, and in an especially preferred embodiment the angle α is about 135°.

Figure 2:
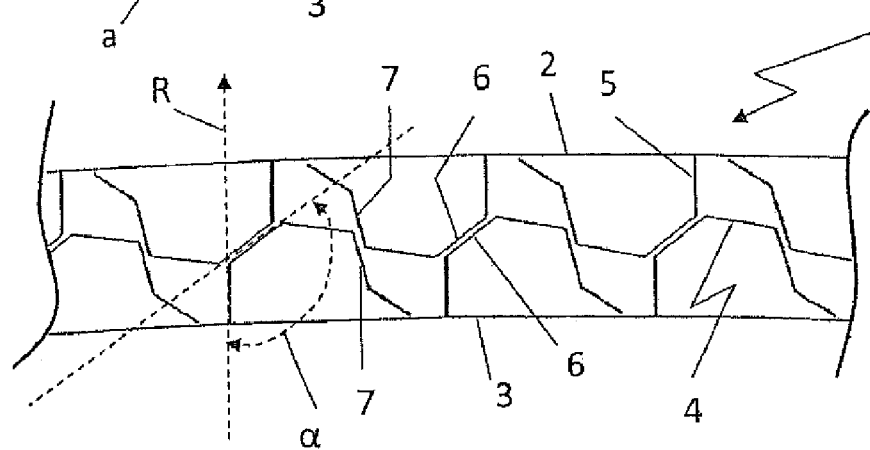

The angle α is emphasized in FIG. 2, which otherwise shows a substantially identical configuration as in FIG. 1 where the difference is only that the tunnel wall 7 that is not fixed at the support wall 2, 3 is formed as a bent web, whereby the bend has the function to deflect, upon a crash, the deformation or the direction of the deformation of the structural element 4.

Figure 3A:
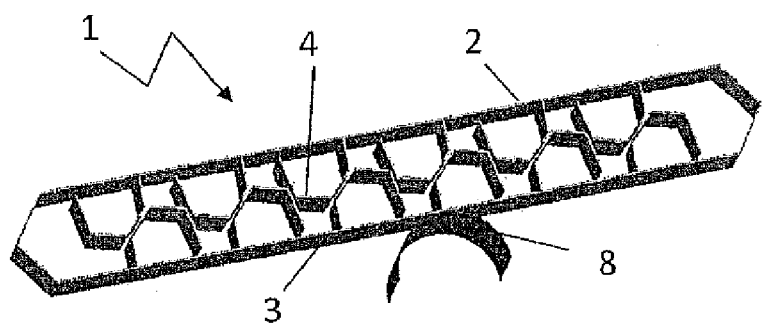
FIGS. 3a and 3b each show a schematic illustration of the deformation behavior upon impact by a pedestrian.
Figure 3B:
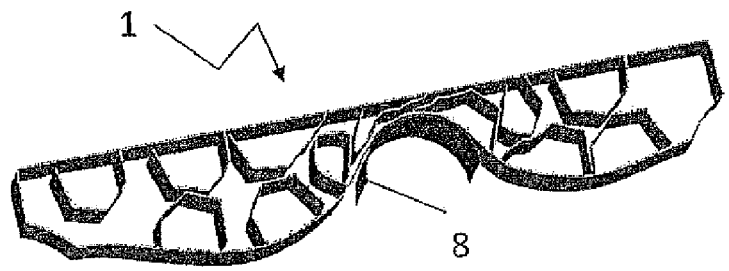

FIGS. 3a and 3b show in a schematic illustration the deformation behavior of the energy absorber according to the present invention during a local impact, which can be compared to the collision, for example with the knee or the shin of a pedestrian. In this illustration, it is shown that the impactor 8 does not incur solid resistance by the structural elements 4, but that the structural elements at the gliding surfaces 6 and 7 are sliding past each other and, while absorbing the impact energy, are becoming completely deformed.

Figure 4A:
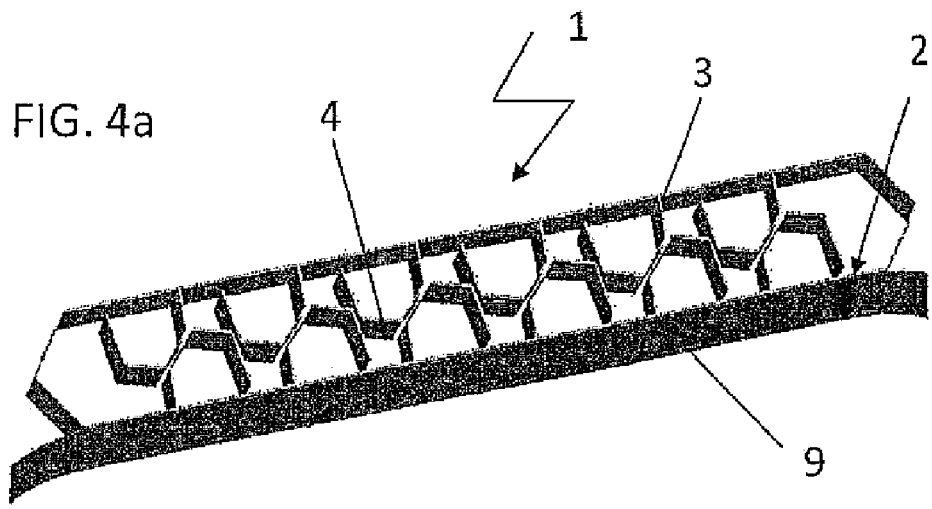
FIGS. 4a to 4c shows a schematic illustration of the deformation behavior at a pendulum impact.
Figure 4B:
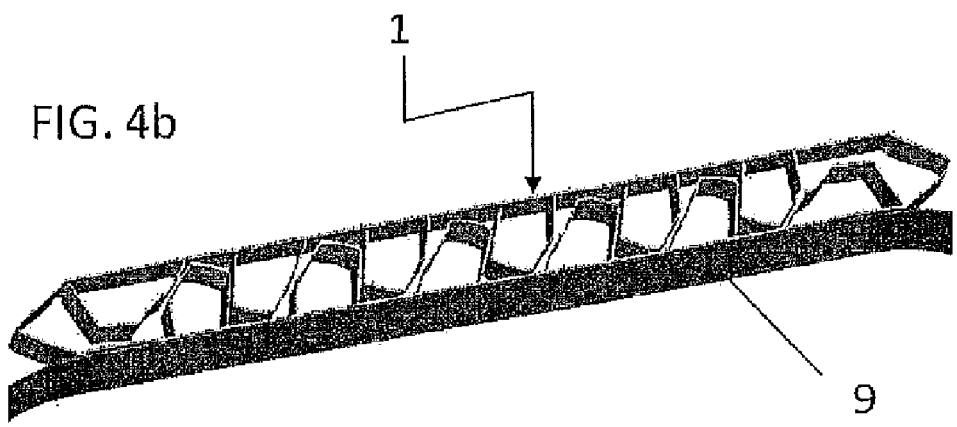
Figure 4C:
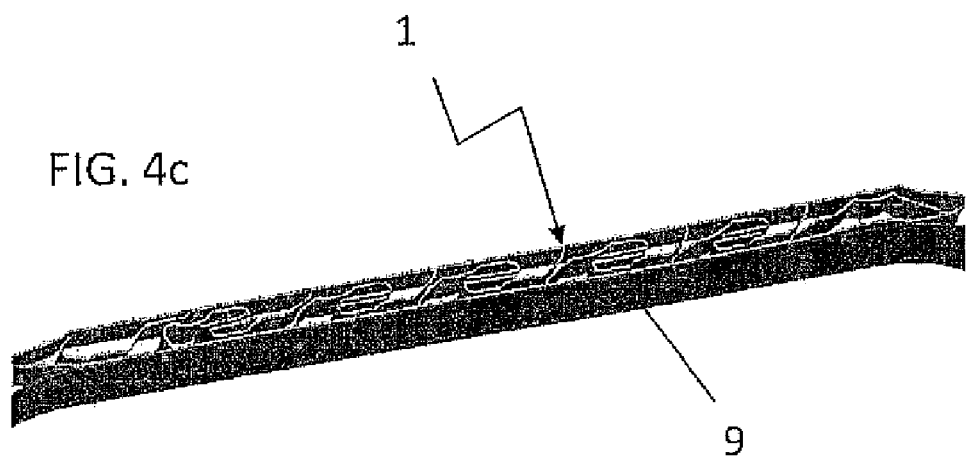

FIGS. 4a to 4c show the course of the deformation in the energy absorbing body 1 at an impact across a large area, as it would occur during a pendulum impact when hitting the bumper of a car. When placing uniform stress upon the energy absorber by means of the pendulum 9, all energy absorbing structural elements are moving towards each other. At the oblique gliding surface 6, lateral forces are released that work against the gliding off at this plane. Up to a certain point, the energy absorbing elements are hampering each other. Only after a certain level of energy has been passed, the structural elements 4 will slide along gliding surfaces 6, 7 into each other, as shown in FIG. 4, until they hit the opposite support wall 3 and under absorption of further energy become completely folded as shown in FIG. 4c.

Figure 5A:
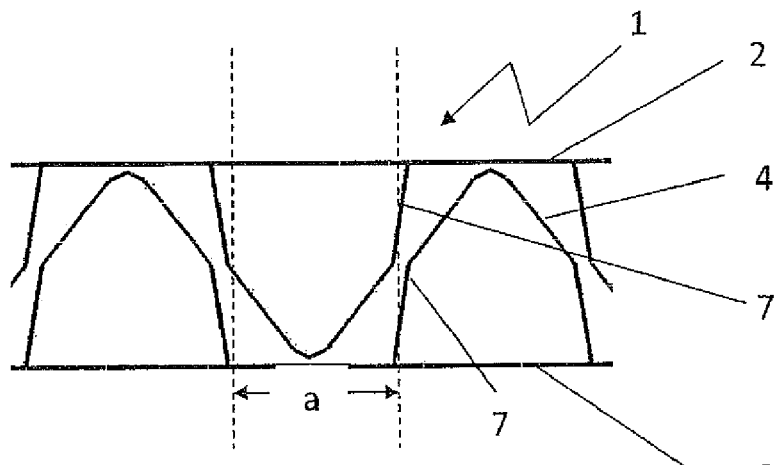
FIGS. 5a to 5e show a schematic illustration of the deformation behavior upon pendulum impact on a further example for an energy absorber.
Figure 5B:
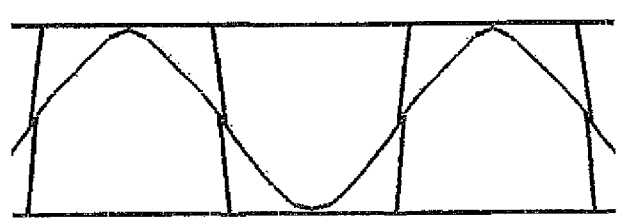
Figure 5C:
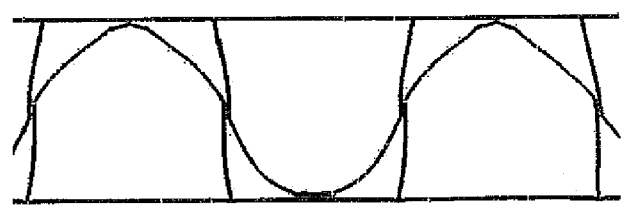
Figure 5D:
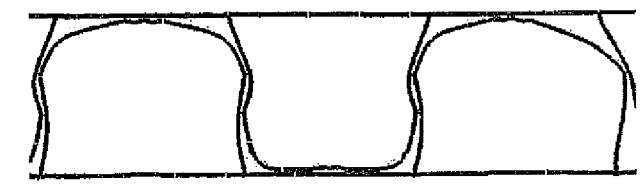
Figure 5E:

FIGS. 5a to 5e show the embodiment of the present invention where the energy absorbing structural elements 4 are configured approximately symmetrical and the distance a between each of the structural elements 4 arranged at the support wall 2, 3 is large enough that each structural element situated opposite the gap, in case of an impact, can be entirely received up to a certain degree of compression. Thus, at first, the compression incurs no substantial resistance. This condition is distinctly shown in FIGS. 5b and 5c. During an impact across a large area, for example from a bumper of a motor vehicle, the energy absorbing structural elements 4 are moved further into each other and thereby are adjoining each other as shown in FIGS. 5d and 5e, whereby the energy absorber should have a sufficient firmness to prevent smaller damages as much as possible.

In case of an impact by a pedestrian at this configuration which is not shown here, only an energy absorbing structural element 4 is moved in the direction of the opposite support wall 2, 3 which first incurs little resistance due to the large gap between the two oppositely located set off structural elements 4. When further energy impacts locally, the two opposite set off structural elements 4 laterally yield since there is no mutual support from the structural elements 4 arranged further away. This results in the energy absorber reacting in a soft manner upon impact with a pedestrian, and to thus fulfill the legal requirements for pedestrian protection.

From the figures and the description the energy absorber has been shown in connection with a bumper system of a motor vehicle. However, the principle of the present invention in the afore-described energy absorber is not limited to the case described here, but can be utilized anywhere where there is the danger of collision involving body elements of motor vehicles. The energy absorber can be utilized as a separate absorbing body 1 or the energy absorbing structural elements 4 can be directly integrated into the element of the motor vehicle body.

While the invention has been illustrated and described as embodied in an energy absorber in connection with a bumper system, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An energy absorber, for absorbing an impact on the body element of a motor vehicle comprising:
    an energy absorbing body including two successively arranged support walls that are distanced from each other by a plurality of energy absorbing structural elements, wherein each one of the energy absorbing structural elements is configured as a U-shaped, tunnel-shaped polyhedron disposed separately at a respective support wall and firmly connected at the respective support wall, wherein each of the structural elements is provided with gliding surfaces for mutual engagement of corresponding gliding surfaces of structural elements of the opposing support wall, wherein the energy absorbing structural elements are arranged set off relative to each other at the corresponding support walls which are located opposite each other.

2. The energy absorber of claim 1, wherein each energy absorbing structural element is connected to the support wall by means of a foot of at least one web which forms a wall of the structural element.

3. The energy absorber of claim 2, wherein the tunnel-shaped polyhedron extends perpendicular to the direction of a potential impact upon the energy absorbing body.

4. The energy absorber of claim 1, wherein the polyhedrons are of random shape.

5. The energy absorber of claim 1, wherein each of the polyhedrons is random shaped and having walls forming a tunnel ceiling, wherein at least one of the walls represents a gliding surface that adjoins the gliding surface of the oppositely located polyhedron, wherein the gliding surface is oriented at an angle α relative to a direction from a potential impact to the energy absorber.

6. The energy absorber of claim 5, wherein the angle α is in the range of 90° to 180°.

7. The energy absorber of claim 5, wherein the angle α is in the range of 120° to 150°.

8. The energy absorber of claim 5, wherein the angle α is 135°.

9. The energy absorber of claim 5, wherein a substantial number of gliding surfaces is oriented in the direction of a potential impact to the energy absorber.

10. The energy absorber of claim 1, wherein the polyhedrons are arranged at a distance from each other at the support wall thereby forming a gap such that when the two support walls are compressed due to impact, the oppositely located structural element is entirely received within the gap.

11. An energy absorber, for absorbing an impact on the body element of a motor vehicle comprising:
an energy absorbing body including two successively arranged support walls that are distanced from each other by a plurality of energy absorbing structural elements, wherein each one of the energy absorbing structural elements is configured as a U-shaped, tunnel-shaped polyhedron disposed separately at a respective support wall and firmly connected at the respective support wall by polyhedron walls, wherein each of the structural elements is provided with gliding surfaces for mutual engagement of corresponding gliding surfaces of structural elements of the opposing support wall, wherein the structural elements that are disposed at each of the support walls are distanced from each other at a uniform and defined distance which corresponds to the configuration of the structural elements disposed relative to the opposite support wall.

12. The energy absorber of claim 11, wherein the polyhedrons are arranged at distance from the other element at the support wall thereby forming a gap such that when the two support walls are compressed due to impact, the oppositely located structural element is entirely received within the gap.

13. The energy absorber of claim 11, wherein the gliding surfaces are oriented substantially in the direction R of a potential impact to the energy absorber.

14. The energy absorber of claim 11, wherein each energy absorbing structural element is connected to the support wall by means of a foot of at least one web which forms the wall of the structural element.

15. The energy absorber of claim 11, wherein the tunnel-shaped polyhedron extends perpendicular to the direction of a potential impact upon the energy absorbing body.

16. The energy absorber of claim 11, wherein the polyhedrons are of random shape.

17. The energy absorber of claim 16, wherein each of the polyhedrons walls forming a tunnel ceiling, wherein at least one of the walls represents a gliding surface that adjoins the gliding surface of the oppositely located polyhedron, wherein the gliding surface is oriented at an angle α relative to a direction from a potential impact to the energy absorber.

18. The energy absorber of claim 17, wherein the angle α is in the range of 90° to 180°.

19. The energy absorber of claim 17, wherein the angle α is in the range of 120° to 150°.

20. The energy absorber of claim 17, wherein the angle α is 135°.

21. The energy absorber of claim 17, wherein a substantial number of gliding surfaces are oriented in the direction of a potential impact to the energy absorber.

* * * * *